Figure 1:
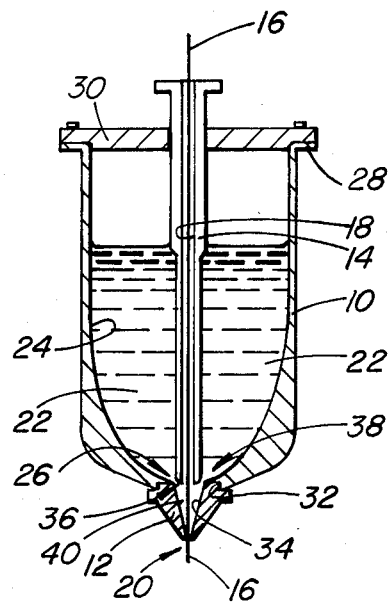

United States Patent [19]

Nundy

[11] Patent Number: 4,579,079

[45] Date of Patent: Apr. 1, 1986

[54] APPARATUS FOR USE IN COATING AN ELONGATE FILAMENT

[75] Inventor: Stanley D. Nundy, Saskatoon, Canada

[73] Assignee: Northern Telecom Limited, Montreal, Canada

[21] Appl. No.: 555,625

[22] Filed: Nov. 28, 1983

[51] Int. Cl.[4] .............................................. B05C 3/15
[52] U.S. Cl. .................................... 118/405; 118/420; 118/DIG. 18
[58] Field of Search ............... 118/405, DIG. 18, 420; 427/434.7, 434.5, 163

[56] References Cited

U.S. PATENT DOCUMENTS

| | | | |
|---|---|---|---|
| 2,341,731 | 2/1944 | MacGregor et al. | 178/405 X |
| 2,360,097 | 10/1944 | Balthes et al. | 118/405 X |
| 4,409,263 | 10/1983 | Aloisio, Jr. et al. | 118/405 X |

FOREIGN PATENT DOCUMENTS 2048726  12/1980  United Kingdom ................ 118/405

Primary Examiner—John P. McIntosh
Attorney, Agent, or Firm—Stuart L. Wilkinson

[57] ABSTRACT

To uniformly coat a fiber, it is fed downwards through a passage filled with a coating fluid. The passage has a downwardly tapering lower zone into which fluid is directed from outside the passage uniformly, radially inwardly and downwardly. The fluid directed into the lower zone suppresses turbulence within the fluid at a bottom outlet aperture within the lower zone. The passage at an upper zone is large enough to allow bubbles to float to the surface of the fluid. The arrangement prevents turbulence and air bubbles from causing thinly coated fiber regions which might adversely affect the fiber integrity. The passage is defined by two relatively moveable bodies so that the rate at which the coating fluid is injected into the lower zone can be varied.

6 Claims, 2 Drawing Figures

U.S. Patent     Apr. 1, 1986     4,579,079

APPARATUS FOR USE IN COATING AN ELONGATE FILAMENT

This invention relates to apparatus for use in coating an elongate filament and particularly to such a method and apparatus for coating an optical waveguide drawn directly from preceding waveguide manufacturing equipment.

Dielectric optical waveguides should have sufficient strength and integrity that they are not damaged by operations occurring subsequent to fiber drawing such as fiber take-up onto reels, fiber characterization, fiber cabling and cable installation. The waveguide integrity can be markedly reduced if the various handling processes introduce surface defects into the fiber.

Plastic coatings can provide good protection against surface defects resulting from abrasion and other mechanical stresses. Such coatings can also reduce microbending loss and cross talk between fibers. The coating should be sufficiently thick and resilient to protect the underlying fiber in spite of any bending of the fiber. The coating should also be mechanically strippable, non-hydroscopic, concentric with respect to the fiber and uniform thickness. Suitable materials for coating optical fibers are silicone, epoxy-acrylates, tetrafluoroethylene, ethylene-vinyl-acetate copolymer, perfluorinated ethylenepropylene and perfluoro-vinylmethyl ether. A variety of coating methods may be used for this purpose a common techinque being shown in U.S. patent 3,980,390 (Yamamoto et al) in which filament immediately after it has been drawn is passed into a reservoir of the suitable coating material and out of the base of the reservoir through a nipple or coating die.

In order to obtain higher fiber drawing speeds, tapered dies have been proposed, the tapered dies tending to give a more concentric coating than the simple apertured reservoir known previously. Tapered bore arrangements are described for example in U.S. Defensive publication No. T963002 (Albarino et al).

Even with these tapered dies there is a problem of turbulence resulting when a fiber passes rapidly through a chamber in which viscous coating fluid is substantially static. In the contact zone some of the fluid must be accelerated to the fiber speed relative to the rest of the fluid in the chamber. If the turbulence persists to the die exit aperture, it can result both in a variation in coating thickness and in the introduction of air bubbles into the coating so weakening the jacketed fiber.

One attempt to solve the problem of turbulence is described in U.S. Pat. No. 4,294,190 (Ohls). As described in this patent specification a die and reservoir are configured such that the fiber passes through a tapered die full of coating fluid. Additional fluid is supplied from a reservoir not into the top of the die where the fiber enters the fluid, but some way down the tapered die through a series of radial ports extending through the die and providing fluid communication between the reservoir and the tapered bore. The provision of individual fixed aperture ports does not permit easy adjustment of the equipment to compensate both for changing coating fluid viscosity or change in the speed at which fiber is drawn through the die. Consequently, if the coating fluid viscosity increases or the fiber draw speed is increased, the fiber may be imperfectly coated. In addition, eccentricity of the fiber within the coating can result from using several discrete inlet ports especially if they are not exactly radially symmetric.

An alternative arrangement is now proposed which overcomes the problems of fiber coating eccentricity and turbulence discussed previously. In addition, the arrangement can be easily adjusted to take account of changes both in fiber drawing speed and coating fluid viscosity.

According to one aspect of the invention, there is provided a fiber coating mechanism comprising means defining a passage, the passage having an upper vertical zone of substantially uniform cross-sectional area communicating at a lower end thereof with a downwardly tapering lower zone, the lower zone substantially centro-symmetric about a vertical axis, the lower zone at an upper end thereof greater in cross-sectional area than the upper zone and at a lower end thereof less in cross-sectional area than the upper zone, the lower zone having an annular fluid inlet zone at an outer extremity thereof at said upper end and an exit aperture at the lower end thereof, the exit aperture vertically aligned with a central axis of the upper zone, means for feeding fiber vertically downward through the passage, and means for feeding fluid into the passage through the inlet aperture to fill the lower zone and at least partially to fill the upper zone.

The passage can be defined by a regulating valve and a cup, the upper zone defined by a bore through a stem of the valve the lower zone defined by a lower part of the cup and the annular aperture defined by an inner wall of the cup and an outer surface of the valve stem.

The cup can have a nipple in a base thereof, the nipple having a tapered coating chamber therein. The cup can have a tapered fluid storage chamber above the annular aperture.

The valve stem can be vertically reciprocal whereby the size of the annular gap can be adjusted. The valve stem can screw engage a bore through a lid for the cup.

The cup preferably has an inner wall which is steep at the top of the cup and becomes shallower towards the annular aperture. The nipple preferably has a conical inner surface. The fluid coating mechanism can further include means for supplying fluid to the storage chamber to a level whereby to set the pressure of fluid at the annular aperture. The nipple can be screw threaded into the base of the cup.

According to another aspect of the invention there is provided a method of coating a fiber comprising feeding the fiber vertically downward through a passage filled with coating fluid, the passage having an upper zone within which air bubbles and turbulence are inevitably introduced into the fluid the upper zone being of sufficient length and cross-sectional area to permit the introduced bubbles to float upwardly therethrough, the passage further having a downwardly tapering lower zone, the method further comprising directing fluid uniformly radially inwardly and downwardly into the lower zone to suppress the introduced turbulence at an exit aperture at a lower end of the passage.

Figure 2:
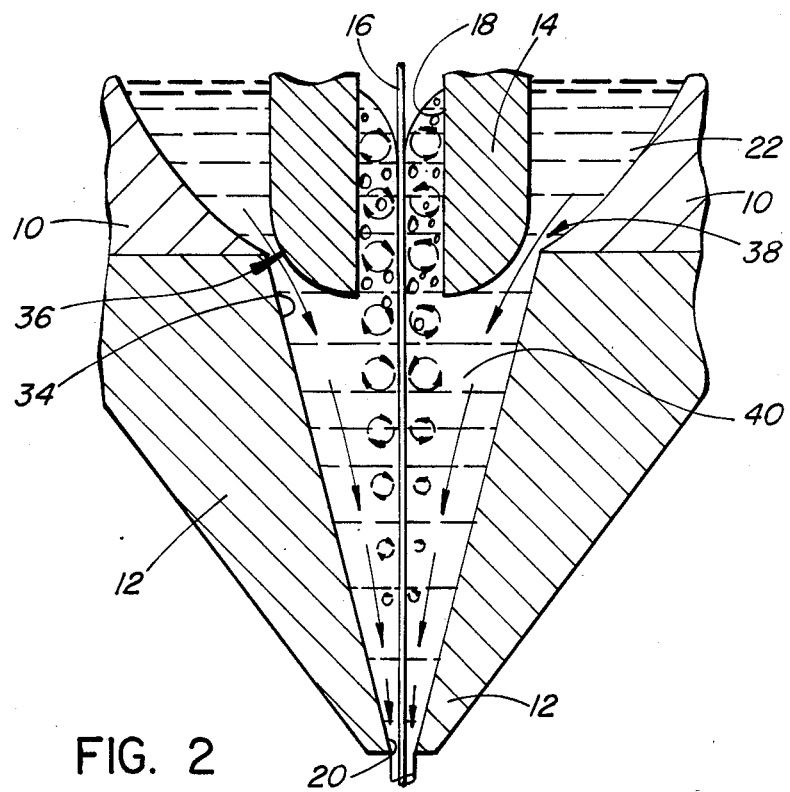

An embodiment of the invention will now be described by way of example with reference to the accompanying drawings in which:

FIG. 1 is a sectional view through a coating mechanism according to the invention; and FIG. 2 is a sectional view to a larger scale of a part of the FIG. 1 mechanism.

Referring in detail to FIG. 1, there is shown a coating mechanism having a cup 10, a nipple 12 and a valve 14.

A fiber 16 is drawn vertically downwards through a bore 18 in the valve 14 and out through an aperture 20 at the lower tip of the nipple. Within the nipple 12 the fiber 16 is coated with a protective fluid 22. The cup 10 has an inner surface 24 which is steep at the top end of the cup but which becomes shallower towards an aperture 26 within the base of the cup. Essentially the inner surface of the cup is paraboloid. The nipple 12 which is of stainless steel composition, screw engages within a recess 32 at the base of the cup 10. On a lip 28 of the cup is mounted a stem support 30 through which extends an internally threaded bore. The valve stem is externally threaded and engages within the bore.

As shown to a larger scale in FIG. 2, the nipple 12 has a conical inner surface 34 and the valve stem has a convex lower surface 36. An annular gap or restriction 38 is defined by an angular projection at the junction of the cup 10 and the nipple 12 which opposes the outer convex surface 36 of the valve 14.

As shown in FIG. 2, viscous coating fluid 22 stored within the cup 10 is forced by gravity through the annular gap 38 into a conical chamber 40 defined by the nipple. The level of fluid within the cup is sufficiently high that the fluid extends somewhat up the bore in the valve stem. The shape of the valve 14, the cup 10 and nipple 12 at the gap 38 determine that the fluid 22 is directed radially symmetrically into the chamber 40.

As illustrated in FIG. 2 turbulence and air bubbles are introduced into the fluid 22 by the passage of fiber 16 into and through it. By ensuring a sufficient fluid height and a relatively wide bore 18 within the valve stem 14, air bubbles entrained by the fiber are permitted to float freely up the bore to the surface of the coating fluid within the stem. However, with such a wide bore 18, turbulence tends to be transmitted down through the passage. The persistence of turbulence is discouraged by the flow of fluid through the annular gap 38. As shown in FIG. 2 the relatively large turbulent eddies emitted from the bottom of the valve stem 14 are gradually suppressed within the nipple tapered chamber 40. Consequently immediately above the exit aperture 20 of the nipple, substantially lamellar flow is restored. Thus as the coating fluid exits the die in contact with the fiber 16, it is devoid both of turbulent eddies and air bubbles and thus uniformly coats the fiber.

The pressure and viscosity of fluid 22 within the cup 10 and the width of the annular gap 38 determine the rate at which coating fluid enters the conical chamber 40 within the nipple 12. That rate is set equal to the rate at which fluid exits the nipple 12 with the chamber 40 filled. If the rate at which fiber is being pulled through the coating mechanism is raised and consequently a greater flow of coating fluid into the coating chamber 40 is desired then the annular gap is increased by rotating the valve 14 to lift it through the stem support 30 and increase the size of the annular gap. If the viscosity of the coating fluid changes then compensation can be made either by increasing the height of fluid 22 within the storage reservoir or by changing the size of the annular gap 38, or both. These two operating parameters can be tuned for the desired fluid dynamic activity within the coating chamber 40.

After coating with fluid, the fluid coating is cured for example by heat in the case of a silicone or by ultra-violet light if using acrylates or other ultra-violet curing material.

Although the invention has been described in terms of applying a plastic coating to glass clad optical fiber to protect the fiber, the coating method described can also be used in other circumstances where it is desired to apply a uniform coating to a solid fiber, for example, for applying lower refractive index plastic cladding directly to a fused silica core.

What is claimed is:

1. Apparatus for coating a fiber with a fluid, comprising:

means for feeding a fiber downwardly along a feed path;

a downwardly tapered coating chamber;

a circular fiber inlet aperture to the coating chamber at an upper end thereof;

an annular fluid inlet aperture to the coating chamber at the upper end thereof, said apertures concentrically located;

a fiber exit aperture at a lower end of the coating chamber;

a cup;

a central valve member, concentrically located in the cup, the cup and the valve member defining therebetween a coating fluid storage chamber terminating at said annular aperture;

the valve member having a vertical passage therein terminating at the circular inlet aperture;

said coating chamber, said storage chamber and said passage being in fluid communication through the circular and annular inlet apertures, the passage in the fiber inlet aperture having a diameter substantially greater than that of the fiber, and the fiber exit aperture having a diameter marginally greater than that of the fiber whereby, in use, uncoated fiber enters the fluid within the passage and coated fiber exits the fluid at the fiber exit aperture;

the improvement comprising said fluid having a free surface in the storage chamber and the passage, and the valve member being vertically reciprocable relative to the cup whereby to change the size of the annular inlet aperture and so function as a regulating valve for coating fluid passing from the storage chamber to the coating chamber.

2. Apparatus as claimed in claim 1 the cup having a nipple in a base thereof, the coating chamber defined by an inside surface of the nipple.

3. Apparatus as claimed in claim 2 in which the coating chamber is conical.

4. Apparatus as claimed in claim 1 in which the valve member has a stem and the cup has a lid with above therein wherein the stem screw engages the bore to permit screw controlled vertical movement of the valve member relative to the cup.

5. Apparatus as claimed in claim 1 in which the cup has an inner wall which is steep at the top end thereof and becomes progressively more horizontally oriented near the annular aperture.

6. Apparatus as claimed in claim 1 further comprising means for supplying coating fluid to the cup to a predetermined level whereby to set a desired pressure head at the annular aperture.

* * * * *